United States Patent [19]

Luz

[11] 4,229,023
[45] Oct. 21, 1980

[54] IDENTITY CHECKING DEVICE

[76] Inventor: Wilson S. Luz, Rua Alcindo Guanabara, 25/102, 20.000 Rio de Janeiro RJ, Brazil

[21] Appl. No.: 16,852

[22] Filed: Mar. 2, 1979

[51] Int. Cl.³ .......................................... B42D 15/00
[52] U.S. Cl. .................................... 283/7; 283/9 R
[58] Field of Search .............. 283/7, 9 R, 9 A; 427/1

[56] References Cited

U.S. PATENT DOCUMENTS 3,694,240  9/1972  Miller et al. ......................... 427/1

OTHER PUBLICATIONS

IBM Technical Disclosure Bulletin, "Detection of the Core and Delta of Fingerprints", vol. 17 #2, Jul. 1974 (pp. 406–407).

Primary Examiner—Paul A. Bell
Attorney, Agent, or Firm—Beverlidge, De Grandi, Kline & Lunsford

[57] ABSTRACT

An identity check card including an identified fingerprint of the legitimate card holder, said fingerprint being cut away to provide alternate transparent zones and partial fingerprint zones. The placement of the card over a fresh fingerprint of the same identified finger of the person whose identity is being checked will show immediately if the latter complements the former in its transparent zones thus permitting a quick and reliable check to be effected.

15 Claims, 1 Drawing Figure

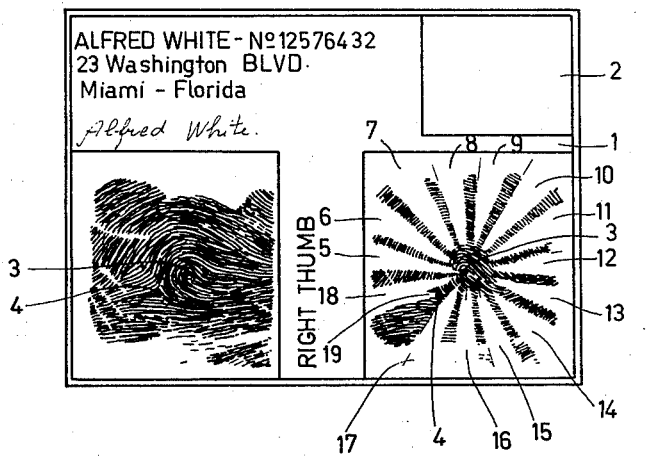

IDENTITY CHECKING DEVICE

BACKGROUND OF THE INVENTION

The present invention pertains to an identity checking device to be carried by a legitimate user for use with a credit card or to provide an absolute quick check of identity when cashing travellers' checks or the like.

It is well known that financial risks are constantly being run, not only by the legitimate holders and users of credit cards and checks but also by credit companies, banks, shops, hotels and so on should such cards or checks be lost or stolen. Positive identity checking at the point of use of credit cards or checks is therefore becoming more and more important, and it is not unusual for commerical establishments to request further identification, while certain credit cards are issued with photographs. Even so, unfortunately, positive identity checking during small financial transactions still leaves much to desire.

SUMMARY OF THE INVENTION

The main object of the present invention is therefore to provide an identity checking device in which the layman can swiftly and surely assure himself that the person before him is indeed the legitimate owner of the credit card, check or the like being used.

According to the present invention such an identity checking device comprises a card having a region carrying an identified fingerprint of the legitimate card holder, said fingerprint having sections cut therefrom whereby said region comprises alternate transparent zones and partial fingerprint zones.

Preferably, said fingerprint is marked with a reference point—which may be the center of the loop or the whorl, depending on the type of fingerprint, using the Vucetich system—and all but one of the transparent zones are radially arranged with respect to said point.

In order further to facilitate the correct orientation of the card over a fingerprint being checked, the fingerprint selected is of a type having a delta and, a second point of reference is chosen as the center of the delta. In such case this second point is chosen to be in one of the partial fingerprint zones from which a small transparent sector is then cut, centered on said second point. In fingerprints having a plain arch (Vucetich system), there is no delta, and only one reference point is readily available, for which reason it is recommended that the print of a different finger be used for the purpose of the invention. Plain arches are not common and at least one of the fingers or thumbs is almost bound to have a delta in the pattern.

Use of the device of the present invention is greatly facilitated if the card is also provided with an identical but complete fingerprint since this further assists in the correct orientation of the card over a fingerprint being checked.

The practical identification of the card holder is very simple. All that is necessary is for him to provide the shop, hotel, bank, etc. with his own fingerprint, after which the check will be effected by marking the fresh fingerprint with the reference point or points used on the card which is then placed thereover, making the reference points coincide. If the fresh print then completes the print pattern through the transparent zones of the card, identification is immediate. If not, the police may be called.

BRIEF DESCRIPTION OF THE DRAWING

The invention will now be described in greater detail, by way of example, with reference to the single FIGURE of the drawing in which an identity checking card according to the present invention is illustrated.

DESCRIPTION OF THE PREFERRED EMBODIMENT

A presently preferred embodiment of the present invention is shown in the drawing as an identity checking card 1 on the upper half of which there is a portrait 2 of the legitimate card holder together with his name, address, signature and a suitable identity number.

The lower half of the card is provided with two identical and identified fingerprints, in this case the thumb of the right hand, although they could obviously be of the left thumb or of any one of the fingers. The fingerprint on the left hand side of the card is complete and is used for facilitating use of the card, whereas the print on the right hand side of the card has parts thereof cut away as will now be described.

First of all, both fingerprints are marked in red with two reference points 3 and 4 which comprise the center of the loop and the center of the delta (Vucetich system), respectively. The fingerprint shown in the drawing results in reference point 4 being below and to the left of reference point 3. However this depends on the particular fingerprint because if the holder has an external or right sloping loop or whorl, point 4 will be to the left of point 3 (as in the drawing), whereas it will be to the right thereof if the fingerprint has an internal or left sloping loop.

The cutting of the right hand side fingerprint is effected as follows. Taking point 3 as a center, a 15° sector 5 is cut away, its apex reaching point 3, in such a position that its lower edge makes an angle greater than 24° and less than 67° with a line passing through points 3 and 4. A further twelve 15° sectors 6 to 17 are then cut away at 9° intervals, centered on reference point 3, but stopping short thereof so that, apart from the top or apex of sector 5, point 3 is surrounded by a small circular fingerprint zone of about 4 mm diameter.

Continuing in a clockwise sense, yet another 15° sector 18 is cut away, only it is separated from sector 17 by a 33° interval, its separation from the first sector 5 being 9° as before so as to complete 360°.

As will be seen from the drawing and bearing in mind the comments above whereby the lower edge of sector 5 is between 24° and 67° from a line joining reference points 3 and 4, the second reference point 4 will lie within the 33° fingerprint area between sectors 17 and 18.

Finally a small sector or nick 19 of approximately 15° is made from cut away sector 18 to the second reference point 4.

Obviously the card will not normally have sectors 5 to 19 cut away in separate operations but instead a special stamp to cut the card would be used, said stamp having two variable centers so that it can be adapted to any two given reference points. This tool, however, does not form part of the present invention nor is its specific form important to the understanding or basic working thereof, for which reason no further description will be made.

Finally, the complete card 1 is plastified, the plastic being cut away in the cut away sector 5 to 19 which are therefore not merely transparent zones but, in fact, openings through the card.

The use of the card shown in the drawing is very simple. When it is desired to make an identity check, the holder is requested to provide a print of his right thumb on any suitable white surface. Using the comparison fingerprint on the left hand side of card 1 as a guide, the two reference points 3 and 4 are then marked on the first print after which the aperture print on the card is placed thereover, with the corresponding reference points aligned. If the fresh print completes the apertured print on the card, then identification is achieved. Such a card is suitable as a credit card.

A further use of the new system of this invention would be with travellers' checks which, on being issued, would be marked individually with the holder's relevant fingerprint. On cashing the check, the print on the check would be verified against that of the card as would also a fresh print given by the holder at the time. Any discrepancy between the three prints would indicate a fraud.

It will be appreciated that the preferred embodiment of the invention as described above and illustrated in the drawing is in no way a limitation on the true scope of the invention. There are, of course, many other ways of separating a fingerprint into alternated transparent and partial fingerprint zones and all such are intended to be included in the invention which is to be limited only by the scope of the following claims.

I claim:

1. Identity Checking Device comprising a card having a region carrying an identified fingerprint of a given finger of the legitimate card holder, said fingerprint having sections cut therefrom whereby said region comprises alternate transparent and partial fingerprint zones.

2. Identity Checking Device according to claim 1 in which at least the majority of said transparent zones are radially arranged with respect to a first reference point of said fingerprint.

3. Identity Checking Device according to claim 2 in which said transparent zones are centered on but, except for one, do not reach said first reference point which is the center of a relatively small circular fingerprint zone, cut only by said one transparent zone.

4. Identity Checking Device according to claim 3 in which said transparent zones are larger angle sectors than said partial fingerprint zones.

5. Identity Checking Device according to claim 4 in which the majority of transparent zones comprise fourteen approximately 15° sectors separated, except for one pair thereof, by thirteen approximately 9° partial fingerprint sectors.

6. Identity Checking Device according to claim 5 in which there is a fourteenth partial fingerprint sector having an angle of approximately 33°, said fourteenth sector containing a second reference point of said fingerprint and a sector thereof removed, centered on said second reference point, to define an additional transparent zone.

7. Identity Checking Device according to claim 6 in which said additional transparent zone defines an angle of approximately 15° at said second reference point.

8. Identity Checking Device according to claim 6 in which, depending on the type of fingerprint, said first reference point is a point chosen from (a) the center of the loop and (b) the center of the whorl, and further in which said second reference point is the center of the delta (Vucetich system).

9. Identity Checking Device according to claim 2 in which, depending on the type of fingerprint, said first reference point is a point chosen from (a) the center of the loop and (b) the center of the whorl (Vucetich system).

10. Identity Checking Device according to claim 9 in which said card has a second region carrying a second but complete fingerprint of said given finger next to said first mentioned partially transparent fingerprint, to assist checking during use.

11. Identity Checking Device according to claim 10 in which said second fingerprint has said first reference point marked thereon.

12. Identity Checking Device according to claim 10 in which said card is provided with other identification information, including the name and signature of said legitimate card holder.

13. Identity Checking Device according to claim 12 in which said card is a credit card.

14. Identity Checking Device according to claim 12 in which said other information includes a photograph of said legitimate card holder.

15. Identity Checking Device according to claim 12 in which said other information includes a holder identity number.

* * * * *

UNITED STATES PATENT AND TRADEMARK OFFICE
CERTIFICATE OF CORRECTION

PATENT NO. : 4,229,023

DATED : October 21, 1980

INVENTOR(S) : Wilson Simoes Luz

It is certified that error appears in the above—identified patent and that said Letters Patent is hereby corrected as shown below:

On the title page, the descriptive figure and the sheet of drawing should appear as shown on the attached sheet.

UNITED STATES PATENT AND TRADEMARK OFFICE
CERTIFICATE OF CORRECTION

PATENT NO. : 4,229,023
DATED : October 21, 1980
INVENTOR(S) : Wilson Simoes Luz

It is certified that error appears in the above—identified patent and that said Letters Patent is hereby corrected as shown below:

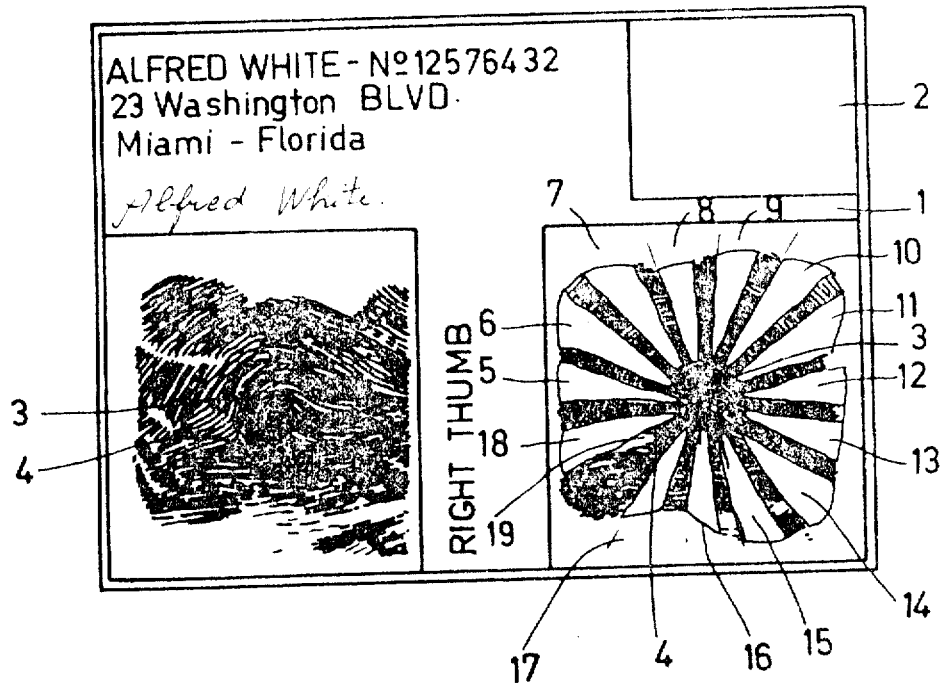

Signed and Sealed this

Eighteenth Day of August 1981

[SEAL]

Attest:

Attesting Officer

GERALD J. MOSSINGHOFF

Commissioner of Patents and Trademarks